United States Patent
Hirschmann et al.

(10) Patent No.: US 6,852,157 B2
(45) Date of Patent: Feb. 8, 2005

(54) FLEXOGRAPHIC PRINTING INK FOR PRINTING CONTROL MARKS

(75) Inventors: Herbert Hirschmann, Oberkirch (DE); Guido Schweizer, Merklingen (DE); Jörg Pohé, Laichingen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 37 days.

(21) Appl. No.: 10/138,578

(22) Filed: May 6, 2002

(65) Prior Publication Data

US 2003/0005842 A1 Jan. 9, 2003

(30) Foreign Application Priority Data

May 9, 2001 (DE) .......................................... 101 22 529

(51) Int. Cl.$^7$ ............................................ C09D 11/02
(52) U.S. Cl. ................ 106/31.64; 106/31.72; 106/31.82; 106/31.84; 106/31.9; 252/301.21; 252/301.26; 252/301.51
(58) Field of Search .......................... 106/31.64, 31.72, 106/31.82, 31.84, 31.9; 252/301.21, 301.26, 301.31

(56) References Cited

U.S. PATENT DOCUMENTS

| | | | | |
|---|---|---|---|---|
| 4,151,618 A | * | 5/1979 | Carpenter ....................... 5/284 |
| 4,186,020 A | * | 1/1980 | Wachtel ....................... 523/161 |
| 4,220,586 A | | 9/1980 | Cseh et al. |
| 4,306,875 A | * | 12/1981 | De Feo et al. .................. 8/471 |
| 4,513,301 A | * | 4/1985 | Takayama et al. .......... 503/200 |
| 4,533,930 A | * | 8/1985 | Shioi et al. .................. 503/211 |
| 4,552,792 A | | 11/1985 | Julian et al. .................. 428/40 |
| 4,587,141 A | | 5/1986 | Cooley ....................... 427/379 |
| 4,602,264 A | * | 7/1986 | Shioi et al. .................. 503/205 |
| 4,647,951 A | * | 3/1987 | Yamori et al. ............... 503/200 |
| 4,839,332 A | * | 6/1989 | Ikeda et al. .................. 503/212 |
| 5,098,477 A | * | 3/1992 | Vieira et al. ............. 106/31.27 |
| 5,248,555 A | * | 9/1993 | Matsushita et al. .... 428/402.24 |
| 5,395,667 A | * | 3/1995 | Ohno et al. .................. 428/41.3 |
| 5,514,208 A | * | 5/1996 | Nagai et al. ............. 106/31.43 |
| 5,516,362 A | * | 5/1996 | Gundjian et al. ......... 106/31.32 |
| 5,709,738 A | * | 1/1998 | Cronlund et al. ......... 106/31.67 |
| 5,800,909 A | * | 9/1998 | Nitta et al. .................. 428/207 |
| 5,853,464 A | * | 12/1998 | Macpherson et al. ...... 106/31.6 |
| 5,980,087 A | | 11/1999 | Brandon et al. |
| 6,288,162 B2 | * | 9/2001 | Leugs et al. ................. 524/560 |
| 6,544,323 B2 | * | 4/2003 | An ........................... 106/31.68 |

FOREIGN PATENT DOCUMENTS

| | | |
|---|---|---|
| DE | 195 10237 | 9/1996 |
| EP | 281 720 | 9/1988 |
| WO | 96/31565 | 10/1996 |
| WO | 99/27024 | 6/1999 |
| WO | 99/52982 | 10/1999 |
| WO | 99/55761 | 11/1999 |
| WO | 00/63318 | 10/2000 |

OTHER PUBLICATIONS

Derwent Abst. 87–57441/09 = DE 35 29 798, Aug. 1985.
Ullmann's Encyclopedia of Industrial Chemistry 6th Ed. (2000).

* cited by examiner

Primary Examiner—Mark L. Bell
Assistant Examiner—Veronica F. Faison
(74) Attorney, Agent, or Firm—Keil & Weinkauf

(57) ABSTRACT

A luminescent flexographic printing ink for printing control marks comprises a combination of a light-scattering pigment and an optical brightener and is not opaque. The luminescent flexographic printing ink is used for printing control marks and bar codes and for the production of decorative papers, wood laminates and floor panels.

18 Claims, No Drawings

FLEXOGRAPHIC PRINTING INK FOR PRINTING CONTROL MARKS

The present invention relates to a luminescent flexographic printing ink for printing control marks, which comprises a combination of a light-scattering pigment and an optical brightener and which is not opaque. The present invention furthermore relates to the use of luminescent flexographic printing ink for printing control marks and bar codes and for the production of decorative papers, wood laminates and panels.

Decorative papers for the production or finishing of wood-based materials are known in principle. Decorative papers are produced by printing suitable decorations on special white or colored papers by the gravure printing process. Wood grains constitute a widespread motif; however, stone, ceramic, cork or purely imaginative decoration are also printed.

For the production of laminates, the decorative papers obtained are impregnated with impregnating resins, for example melamine/formaldehyde resins, and finally laminated with suitable support materials, for example particle boards or high- or medium-density fiber boards, under pressure and with heat. An overlay paper for protecting the laminate can also be laminated with the decorative paper. This is customary in particular in the production of floor laminates. Further details of the production of such laminates are described, for example, in Ullmann's Encyclopedia of Industrial Chemistry, 6th Edition, Electronic Release: Wood 2.4.3.3. Decorative Laminates, or in U.S. Pat. No. 4,552,792 and U.S. Pat. No. 4,587,141.

The laminates obtained are further processed, inter alia, in the building and furniture industries. They can be further processed, for example, to give panels, in particular floor panels for laminate floors. For this purpose, large laminate boards are sawn into strips by means of special multiblade saws. The exact alignment of the laminate boards along the desired sawing direction is important. On the one hand, panels having an exact fit must be obtained, and furthermore the saw cut should always be effected in the same position with respect to the pattern, for example always parallel to wood grain. With exact positioning during the sawing process, the boards can be mounted, for example, on an orientable saw table. The saw or the saw table is usually controled by means of black marking lines which can be detected with the aid of contrast detectors (light/dark detectors). The signal generated by the detector is used for controling the saw apparatus.

Said black marking lines for controlling the saw are usually present on the decorative paper which was used for the production of the laminate. In the production of the decorative paper, they are printed directly on the decorative paper by means of a flexographic printing unit downstream of the gravure printing unit. The decorative paper having the printed-on marking lines is then processed to give the laminate. The laminate obtained is sawn into strips as described. The saw cut is effected exactly along the marking lines, so that these are sawn away and no marking lines at all are visible on the panel obtained. The combined gravure/flexographic printing technique has the great advantage that panels having a very wide range of widths with otherwise identical decoration can be produced in a simple manner. Only one set of expensive gravure printing cylinders is required for a specific wood pattern. Control marks for sawing can be printed on by means of comparatively cheap flexographic printing cylinders individually according to the desired width and length of the panels.

When carrying out the process for the production of panels, however, a person skilled in the art is confronted by a number of problems.

In the case of dark wood hues or decorations, the contrast with the black marking lines is frequently no longer sufficient for ensuring trouble-free detection of the marking line by the detector. From time to time, the saw control then no longer follows the marking lines but the wood grain. This results in high rejection rates.

It is known that this problem can be solved by providing cut-outs in the gravure printing cylinders so that the paper is not printed at all in certain parts. This gives rise to paper-colored lines on the decorative paper. However, the process is extremely uneconomical because a separate, comparatively expensive set of gravure printing cylinders must be manufactured for each desired panel width.

It should furthermore be taken into account that a control mark on the decorative paper must withstand the lamination process without damage. For lamination, pressures of up to 30 bar can be reached in conventional lamination presses, and up to 120 bar in special high-pressure presses, and the temperatures may be up to 180° C. The paper is also subjected to mechanical stress during the impregnation of the paper with the impregnating resin in the impregnating apparatus. Very thick ink layers may flake off under this stress and lead to undesired abrasion, with the result that laminates having contaminated surfaces form. Marking lines may therefore be printed only thinly. Furthermore, the readability of the marking lines may be impaired by contaminated surfaces and poorly printed marking lines. It should be borne in mind here that the marking lines must also be readable through the impregnating resin layer and through any overlay paper.

Such problems occur in particular with the use of white marking lines. Although the contrast on a dark background can in principle be increased by means of white marking lines, a relatively large amount of ink must be used to achieve sufficient contrast. As a result of excessively high ink transfer, however, squeeze edges occur at the edges of the marking lines. These can, as described, flake off in the course of the further process steps. For white marking lines of the required high quality, repeated printing thinly one on top of the other is therefore necessary, which greatly impairs the cost-efficiency of the process.

Finally, the problem of printing control marks on decorative papers which have both light and dark areas is completely unsolved to date.

Luminescent marks which are applied superficially and can be read by means of luminescence scanners are also known in the prior art. Luminescence scanners emit UV light. The UV radiation excites a fluorescent substance, which in turn emits radiation in the visible range, which can be detected by the luminescence scanner. Luminescent marks applied in a thin layer to decorative papers having dark wood hues are, however, difficult to detect.

It is an object of the present invention to provide a suitable flexographic printing ink for printing control marks on decorative papers which is readily detectable in a thin layer both on light and on dark backgrounds, in order thus to permit an economical process for the production of panels.

We have found that this object is achieved by a luminescent flexographic printing ink for printing control marks which comprises a combination of a light-scattering pigment and an optical brightener and which is not opaque. We have also found the use of the luminescent flexographic printing ink for printing control marks and bar codes and for the production of decorative papers, wood laminates and panels.

The novel printing ink and the decorative paper printed therewith contribute in an excellent manner to the process reliability and hence to the economical production of panels, in particular floor panels, with any desired decorative layers.

The light-scattering pigment is used only in limited amounts so that the printing ink is not opaque and the background is still detectable through the printing ink. Usually, the layer has only a slightly hazy effect. Particularly surprising and unexpected is the fact that the readability of the mark with a luminescence detector is considerably improved by the combination of a light-scattering pigment with an optical brightener. Through the synergistic cooperation of optical brightener with a light-scattering pigment, the marks printed by means of the novel printing ink are reliably readable by luminescence detectors both on light and on dark backgrounds, even through any overlay present.

The addition of the light-scattering pigment furthermore has the advantage that a visual quality inspection as in the case of a conventional printing ink is possible during the printing of the decorative paper and during the initial cutting of the laminate. Thus, it is possible to check, without great effort, whether the printing of marks has actually taken place in a satisfactory manner and there are no failures.

Tests with the novel flexographic printing ink showed a substantial reduction in the rejection rate in the production of panels with the use of said ink. In terms of the equipment, only the contrast detectors of the saws have to be replaced by commercial luminescence detectors when the printing ink is used.

Regarding the present invention, the following may be stated specifically.

The novel flexographic printing ink comprises, in a known manner, a solvent or a solvent mixture. In principle, the solvents customary for flexographic printing inks may be used. The novel flexographic printing ink preferably comprises water or a predominantly aqueous solvent mixture as the solvent. Further components of predominantly aqueous solvent mixtures may be, for example, alcohols. The amount of the solvent or solvent mixture is usually from 50 to 80% by weight of solvent, based on the sum of all components of the printing ink.

The binders customary for flexographic printing inks can be used as binders for the novel flexographic printing ink. In particular, binders soluble or dispersible in water or in aqueous solvent mixtures are used. Examples of suitable binders include aqueous dispersions of aromatic or aliphatic polyurethanes, casein or casein derivatives, polyvinyl alcohols or polyvinyl alcohol derivatives, polymers and copolymers of acrylic acid or acrylic acid derivatives, for example acrylates. However, binders soluble in organic media may also be used. The person skilled in the art will make a suitable choice from the binders possible in principle. Preferred binders are casein and casein derivatives. It is of course also possible to use mixtures of different polymeric binders, provided that, in combination with one another, the binders chosen have no undesired properties. The amount of all binders is usually 5–20% by weight, based on the sum of all components of the printing ink.

As features essential for the invention, the printing ink comprises a combination of at least one light-scattering pigment with at least one optical brightener, with the further proviso that the light-scattering pigment is used only in an amount such that the printing ink is not opaque.

The light-scattering pigments are as a rule those pigments whose particle size is greater than the wavelength of visible light, in particular those having a particle size of >400 nm. The stated particle size is based on the diameter in the case of round or approximately round particles and is based on the longest axis in the case of irregularly shaped, for example acicular, particles. However, they may also be pigments having a relatively small particle size, but which are distributed in the form of relatively large agglomerates in the printing ink. Examples of suitable light-scattering pigments are inorganic pigments, such as titanium dioxide pigments, zinc sulfide pigments, iron oxide pigments or bismuth vanadate pigments. However, suitable organic pigments may also be used. White pigments, for example $TiO_2$ or ZnS pigments, are preferably used in the novel printing ink, particularly preferably $TiO_2$ pigments. It is of course also possible to use mixtures of different light-scattering pigments. The amount of the colorants is usually from 5 to 20% by weight, based on the sum of all components.

The optical brighteners are known to be colorless or pale-colored organic compounds which absorb in the UV range and which reemit most of the absorbed UV light as blue fluorescent light having wavelengths of from 400 to 500 nm. Luminescence detectors emit UV light and can detect the resulting fluorescent light. Examples of suitable optical brighteners include distyrylbenzenes, distyrylbiphenyls, stilbene derivatives, such as divinylstilbenes, triazinylaminostilbenes, stilbenyl-2H-triazoles, stilbenyl-2H-naphtho[1,2-d]triazoles and bis(1,2,3-triazolyl)stilbenes, each of which may be further substituted. Further examples include benzoxazoles, stilbenylbenzoxazoles, bisbenzoxazoles, benzimidazole derivatives, pyrazoline derivatives or coumarin derivatives. Optical brighteners are commercially available, for example under the names Blankophor®, Tinopal® or Ultraphor®. Mixtures of different optical brighteners may also be used. The amount of optical brighteners used is usually from 1 to 25% by weight, based on the sum of all components.

The novel flexographic printing ink for printing control marks contains only a limited amount of the light-scattering pigment and is not opaque, i.e. the background is still detectable through the printed and dried printing ink layer. The covering power of the printing ink can be determined in a conventional manner by determining the transmittance $I/I_0$ or the opacity $I_0/I$. The layer preferably appears to be slightly scattering or slightly milky. As a rule, the novel printing ink has a transmittance of 70–95% in the visible range of the optical spectrum.

The novel printing ink can optionally comprise further additives and assistants typical for printing inks. Examples of additives and assistants are waxes for increasing the abrasion resistance and for reducing the friction, for example polyethylene waxes, oxidized polyethylene waxes, petroleum waxes or ceresin waxes. Fatty acid amides can be used for increasing the surface smoothness. Plasticizers serve for increasing the resilience of the dried film. Examples are phthalates, such as dibutyl phthalate, diisobutyl phthalate or dioctyl phthalate, citrates or esters of adipic acid. Dispersants can be used for dispersing the pigments. The total amount of all additives and assistants usually does not exceed 20% by weight, based on the sum of all components, and is preferably 0–10% by weight.

The novel flexographic printing ink can be prepared in a manner known in principle by thorough mixing or dispersing of the components in conventional apparatuses, for example dissolvers, stirred ball mills or a three-roll mill. Advantageously, first a concentrated pigment dispersion comprising a part of the components is prepared, which dispersion is subsequently further processed with further components and further solvent to give the finished printing ink.

The novel flexographic printing ink can be used for printing control marks of all types. These can be read by means of luminescence detectors. The printing ink can also be used for printing bar codes. The limited covering power permits comparatively inconspicuous coding of articles without the marking being completely invisible.

In particular, the novel printing ink is used for the production of decorative papers. Such decorative papers comprise a decorative layer applied to a paper support material. A person skilled in the art makes a suitable choice from the large number of paper types, depending on the desired properties and the use of the decorative paper. The decorative layer is usually applied by means of gravure printing, but the present invention does of course also relate to the use of other printing techniques. Control marks are applied to the decorative layer directly or indirectly with the use of the novel luminescent flexographic printing ink. Control marks printed may be, for example, strokes, continuous lines, dots, circles or the like. Depending on the intended use, a person skilled in the art chooses the form of a control mark suitable in each case. When the decorative paper is used for the production of floor panels, continuous lines arranged parallel in the desired width of the panels have proven useful. The control marks are preferably applied by means of the flexographic printing technique, but the present invention does of course also relate to the use of other techniques.

For printing on decorative paper, casein or a casein derivative has proven particularly useful as a binder or one of the binders of the flexographic printing ink. It imparts, on the one hand, good adhesion to the paper printed with the decorative layer and nevertheless permits good penetration of the total paper by the impregnating resin. The novel decorative paper may optionally also comprise further layers which are applied by printing or coating.

The novel flexographic printing ink can be used for the production of wood laminates and panels by first producing a decorative paper having control marks and processing the resulting decorative paper having the printed-on, luminescent control marks in a conventional manner with impregnating resins to give wood laminates and panels. These can be further processed in the building and furniture industries. Less preferable, but of course possible in principle, is the application of the control marks only after lamination with the surface of the laminate.

The processing of the wood laminates to give floor panels can be carried out using the conventional multiblade saws known in the prior art. By carrying out the process, the saws are equipped with luminescence detectors. The luminescence detectors detect the novel printing ink, and the signals obtained are used for controling the saw table for exact alignment of the saw cut.

The examples which follow illustrate the invention:

EXAMPLE 1

Preparation of the Printing Ink

The starting materials stated in table 1 were used. The components, including the solvent, were combined and were thoroughly mixed and homogenized by means of a conventional mixer. A flexographic printing ink having a slightly milky appearance was obtained.

EXAMPLE 2

The procedure was as in example 1, except that the components stated in table 2 were used. A flexographic printing ink having a slightly milky appearance was obtained.

TABLE 1

Amounts of the starting materials for experiment 1.
The stated amounts are based on the sum of all components.

| Component | | Amount [% by wt.] |
|---|---|---|
| Binder | Casein | 7% |
| | Acrylate/acrylic acid copolymer | 1.5% |
| Light-scattering pigment | Rutile pigment | 15% |
| Optical brightener | Diaminostilbenedisulfonic acid (Tinopal ABP) | 18% |
| Solvent | Water | 57.5% |

TABLE 2

Amounts of the starting materials for experiment 2.
The stated amounts are based on the sum of all components.

| Component | | Amount [% by wt.] |
|---|---|---|
| Binder | Casein | 5% |
| | Acrylate/acrylic acid copolymer | 1.5% |
| | PU resin | 2% |
| Light-scattering pigment | Rutile pigment | 15% |
| Optical brightener | Diaminostilbenedisulfonic acid (Tinopal ABP) | 18% |
| Solvent | Water | 58.5% |

EXAMPLE 3

Production of Decorative Paper

A support paper was printed with a dark wood decor layer by means of a gravure printing unit. Continuous parallel lines were then printed on by means of the printing ink contained in example 1, using a downstream flexographic printing unit. After drying, a decorative paper which had substantially transparent, slightly milky, parallel lines was obtained.

EXAMPLE 4

The procedure was as in example 3, except that the printing ink prepared in example 2 was used. After drying, a decorative paper which had substantially transparent, slightly milky parallel lines was obtained.

EXAMPLES 5 AND 6

Further Processing of the Decorative Paper

The decorative papers obtained in examples 3 and 4 were each laminated by means of a melamine/formaldehyde resin with a high-density fiber board with additional use of an overlay paper in a laminating press. The control marks printed on the decorative paper were readily detectable by means of a luminescence detector, in spite of the impregnating resin layer, and also easily recognizable with the naked eye.

The laminate boards obtained were each placed in a multiblade saw having a movable saw table. The multiblade saw was equipped with luminescence detectors. The laminate board was sawn in each case along the control marks into parallel strips. There were no deviations from the sawing direction. All panels obtained had the same pattern in the correct arrangement.

Comparative Example 1

A conventional black marking ink was used for printing the control marks on the decorative paper printed with the dark wood décor. The decorative paper was processed as described in example 5. A multiblade saw equipped with contrast detectors was used for sawing. The saw blades followed the wood grain instead of the control mark in some cases. Panels of poorer quality were obtained, which did not all have the same, geometrically correct arrangement of the pattern.

EXAMPLE 7

A printing ink was prepared as described in example 1 and was printed on a decorative paper having a dark brown wood décor by means of the flexographic printing technique, and the decorative paper was then processed with a melamine/formaldehyde resin to give a laminate. For flexographic printing, a coarse engraved roller (48 lpc, high ink transfer) was used in one case and a fine engraved roller (120 lpc, low ink transfer) was used in another case. In each case, the reflectance of the total laminate at 425 nm was determined. In an experimental series, the amount of optical brightener was varied; $TiO_2$ was either present or absent. Table 3 lists the results:

TABLE 3

Reflectance at 425 nm as a function of various printing ink compositions

| Amount of optical brightener [% by wt.] | $TiO_2$ | Reflectance (48 1 pc engraved roller) | Reflectance (120 1 pc engraved roller) | Remarks |
|---|---|---|---|---|
| — | — | 9% | 9% | only blank decorative paper |
| 2% | 15% | 16.5% | 13.5% | |
| 8% | 15% | 17.5% | 14% | |
| 15% | 15% | 19% | 14.5% | |
| 30% | 15% | 21% | 17% | |
| 30% | — | 14% | 12.5% | |

The results demonstrate the synergistic cooperation of the optical brightener with the light-scattering pigment. An effect is achieved by using an optical brightener alone. However, the effect is substantially increased by adding a light-scattering pigment. Substantial effects are obtained even when only small amounts of the optical brightener are used.

We claim:

1. A luminescent flexographic printing ink for printing control marks, at least comprising a solvent or a solvent mixture, at least one polymeric binder and optionally further additives, wherein the printing ink furthermore comprises at least one light-scattering pigment and at least one optical brightener in combination with one another, with the additional proviso that the printing ink is not opaque.

2. A flexographic printing ink as claimed in claim 1, wherein the pigment is a white pigment.

3. A flexographic printing ink as claimed in claim 2, wherein the white pigment is a $TiO_2$ pigment.

4. A flexographic printing ink as claimed in claim 1, wherein the solvent is water or a predominantly aqueous solvent mixture.

5. A flexographic printing ink as claimed in claim 1, wherein at least one of the polymeric binders is casein or a derivative thereof.

6. The flexographic printing ink defined in claim 1 wherein the optical brightener reemits absorbed UV light as light having wavelengths of from 400 to 500 nm.

7. The flexographic printing ink defined in claim 2 wherein the optical brightener reemits absorbed UV light as light having wavelengths of from 400 to 500 nm.

8. The flexographic printing ink defined in claim 1 wherein the optical brightener constitutes from 1 to 25% by weight of the ink.

9. The flexographic printing ink defined in claim 2 wherein the optical brightener constitutes from 1 to 25% by weight of the ink.

10. The flexographic printing ink defined in claim 6 wherein the optical brightener constitutes from 1 to 25% by weight of the ink.

11. A luminescent flexographic printing ink for printing control marks, at least comprising a solvent or a solvent mixture, at least one polymeric binder and optionally further additives, wherein the printing ink furthermore comprises at least one light-scattering pigment and at least one optical brightener in combination with one another, with the additional proviso that the printing ink is not opaque, and wherein the light-scattering pigment constitutes from 5 to 20% by weight of the ink.

12. The flexographic printing ink defined in claim 1 wherein the binder constitutes from 5 to 20% by weight of the ink.

13. The flexographic printing ink defined in claim 11, wherein the pigment is a white pigment.

14. The flexographic printing ink defined in claim 13, wherein the white pigment is a $TiO_2$ pigment.

15. The flexographic printing ink defined in claim 11, wherein the solvent is water or a predominantly aqueous solvent mixture.

16. The flexographic printing ink defined in claim 11, wherein at least one of the polymeric binders is casein or a derivative thereof.

17. The flexographic printing ink defined in claim 1, which has a transmittance of 70 to 95%.

18. The flexographic printing ink defined in claim 1, wherein the at least one optical brightener is selected from the group consisting of: distyrylbenzenes, distyrylbiphenyls, stilbene derivatives, benzoxazoles, stilbenylbenzoxazoles, bisbenzoxazols, benzimidazoles, pyrazolines and coumarins.

* * * * *

UNITED STATES PATENT AND TRADEMARK OFFICE
CERTIFICATE OF CORRECTION

PATENT NO. : 6,852,157 B2
DATED : February 8, 2005
INVENTOR(S) : Hirschmann et al.

It is certified that error appears in the above-identified patent and that said Letters Patent is hereby corrected as shown below:

<u>Title page,</u>
Item [73], Assignee, "BASF Aktiengesellschaft, Ludwigshafen (DE)" should read
-- BASF Drucksysteme GmbH, Stuttgart (DE), and
  Süddekor Druckerel GmbH & Co. KG, Laichingen --.

Signed and Sealed this

Thirtieth Day of May, 2006

JON W. DUDAS
*Director of the United States Patent and Trademark Office*